United States Patent [19]

Lutz

[11] Patent Number: 5,123,237

[45] Date of Patent: Jun. 23, 1992

[54] SICKLE BLADE GUIDE

[75] Inventor: Walter Lutz, Elgin, Ill.

[73] Assignee: Lavelle Industries, Inc., Burlington, Wis.

[21] Appl. No.: 657,161

[22] Filed: Feb. 15, 1991

[51] Int. Cl.⁵ ............................................. A01D 34/18
[52] U.S. Cl. ........................................ 56/298; 56/309
[58] Field of Search .................. 56/298, 307, 309, 311

[56] References Cited

U.S. PATENT DOCUMENTS

| 1,755,534 | 4/1930 | Borkhuis, Jr. | 56/309 X |
| 1,844,984 | 2/1932 | Schooneveld | 56/307 |
| 1,872,172 | 8/1932 | Paradise | 56/298 |
| 2,017,466 | 10/1935 | Liebetrau | 56/307 |
| 2,490,261 | 12/1949 | Gable | 56/311 |
| 2,747,358 | 5/1956 | Frazee | 56/309 |
| 2,882,671 | 4/1959 | Naery | 56/307 |
| 2,882,672 | 4/1959 | Naery | 56/307 |
| 3,553,948 | 1/1971 | White | 56/307 |
| 4,519,192 | 5/1985 | Oppenhuisen et al. | 56/298 |
| 4,597,251 | 7/1986 | Cornellier | 56/246 X |

Primary Examiner—George A. Suchfield
Attorney, Agent, or Firm—Reinhart, Boerner, Van Deuren, Norris & Rieselbach

[57] ABSTRACT

A blade guide for supporting a reciprocating sickle blade in an agricultural mower. The blade guide includes a unitary, integrally formed structure formed of a resilient, molded thermoplastic material. To avoid wear, metallic wear plates are provided where the reciprocating sickle blade contacts the blade guide. The side edges of the wear plates cooperate with the reciprocating sickle blades to provide a cutting action as the sickle blades reciprocate. In one embodiment, the side edges of the wear plate are beveled to improve the cutting action. Preferably, the wear plates are molded in place during manufacture.

16 Claims, 1 Drawing Sheet

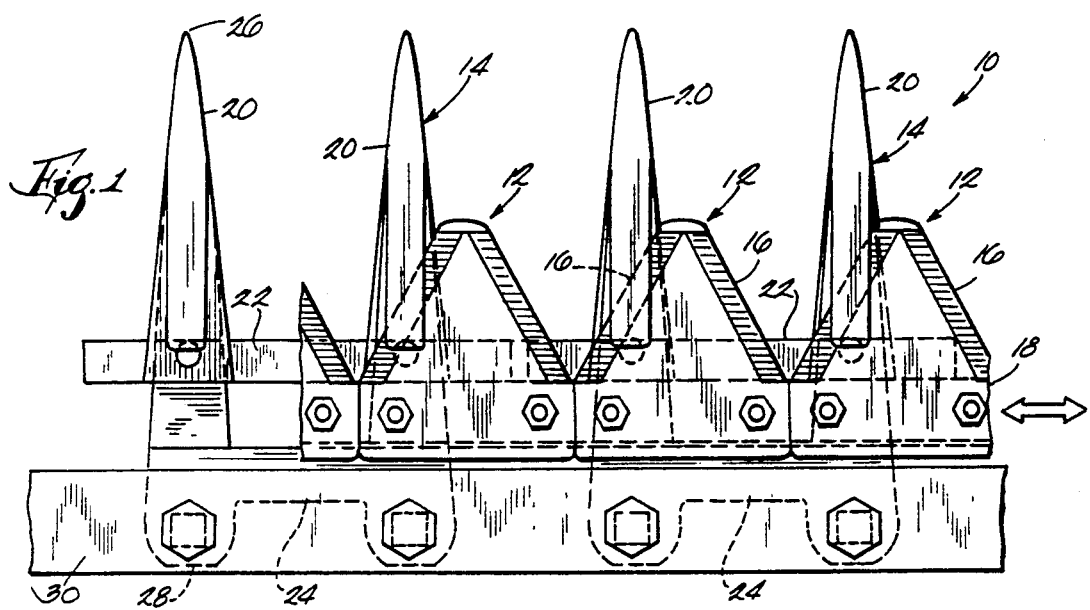
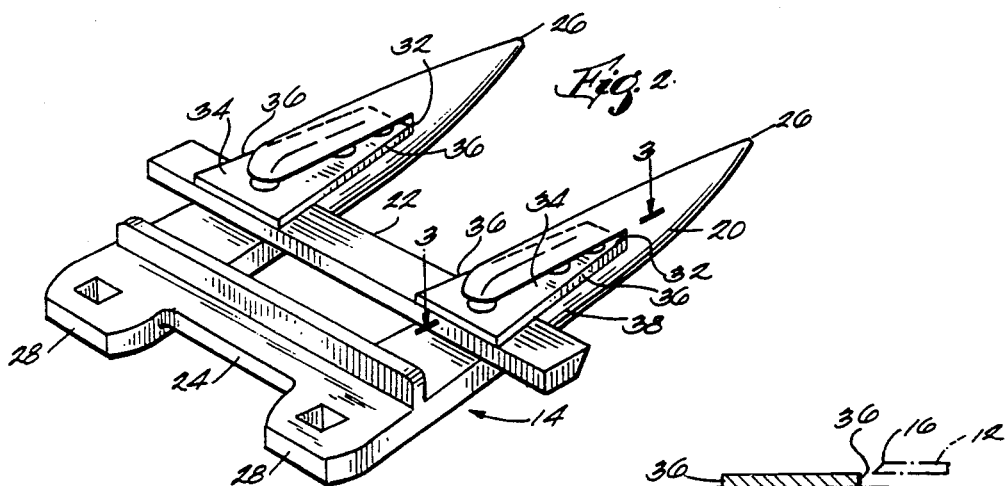
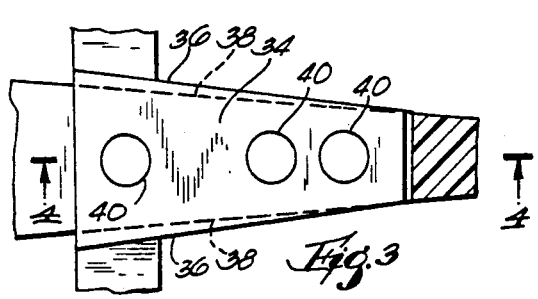
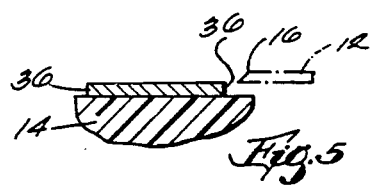
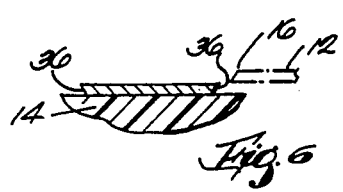
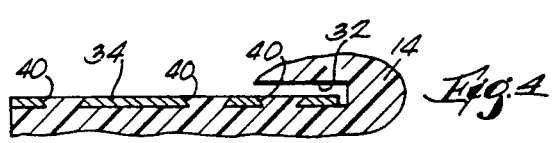

SICKLE BLADE GUIDE

BACKGROUND OF THE INVENTION

This invention relates generally to agricultural cutting equipment and, more particularly, to blade guides for agricultural sickles.

Sickles used in agricultural cutting and harvesting typically include a number of triangular sickle cutter sections or blades mounted on an elongate, moveable, sickle bar. The sickle bar reciprocates relative to a stationary guide structure on which a number of individual blade guide units are mounted in side by side relationship. As the sickle bar reciprocates, a cutting action is produced between each individual sickle section and the adjacent blade guide.

Agricultural sickles are typically carried on or trailed behind a tractor or similar vehicle with the sickle sections and blade guides facing forwardly. As the sickle moves over the ground, it can encounter a variety of obstacles and foreign objects such as rocks and stumps. Blade guide breakage is a common occurrence, even though the blade guides are typically formed of forged steel. Although the blade guides are removable and, hence, replaceable, such replacement nevertheless requires that the machine be removed from service during the repair. It is preferably, therefore, to avoid blade guide breakage in the first instance.

In view of the foregoing, it is a general object of the present invention to provide a new and improved blade guide for agricultural sickles.

It is a further object of the present invention to provide a new and improved blade guide that minimizes the potential for breakage in the event of impact with an unyielding object.

It is a still further object of the present invention to provide a new and improved blade guide that is tough, resilient and durable in use.

SUMMARY OF THE INVENTION

The invention provides an improvement in blade guides for supporting a reciprocating sickle section or blade in an agricultural mower. The improvement comprises forming the blade guide of a thermoplastic material and including a metallic wear plate where the reciprocating sickle section contacts the blade guide.

The invention also provides a blade guide for guiding a reciprocating sickle blade in an agricultural mower wherein the blade guide includes a unitary structure that is formed of a thermoplastic material and has a pair of substantially parallel, laterally spaced, forwardly projecting guide points and a cross member extending between the guide points. The blade guide further includes a pair of wear plates located adjacent the guide points and oriented to engage and support the reciprocating sickle blade of the agricultural mower.

The invention also provides a blade guide mountable on a stationary guide bar in an agricultural mower and operable to support and guide a reciprocating sickle blade in the agricultural mower. The blade guide comprises a first guide point having a pointed end and a blunt end opposite the pointed end, and further includes a second guide point substantially identical to the first guide point. The blade guide further includes a forward cross member extending between the first and second guide points for maintaining the first and second guide points in spaced, substantially parallel orientation relative to each other. The blade guide further includes a rear cross member extending between the first and second guide points adjacent the blunt ends thereof, and a pair of wear plates mounted, respectively, on the first and second guide points adjacent the junctures of the forward cross member with the first and second guide points. The wear plates are oriented so as to engage and support the undersurface of an overlying sickle blade when the blade guide is mounted on the guide bar in the agricultural mower.

In one embodiment, more than two guide points are included in each blade guide.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a top plan view of a portion of an agricultural sickle including sickle blade guides embodying various features of the invention.

FIG. 2 is a perspective view of a sickle blade guide embodying various features of the invention.

FIG. 3 is a cross sectional view of the sickle blade guide shown in FIG. 2 taken along line 3—3 thereof.

FIG. 4 is a cross sectional view of the sickle blade guide shown in FIG. 3 taken along line 4—4 thereof.

FIG. 5 is a fragmentary sectional view of one embodiment of the invention showing wear plates having square edges.

FIG. 6 is a fragmentary sectional view, similar to FIG. 5, of another embodiment of the sickle blade guide including wear plates having beveled edges.

DESCRIPTION OF THE PREFERRED EMBODIMENT

Referring to the drawings, and, in particular, to FIG. 1, a portion of an agricultural sickle is shown at 10. As illustrated, the sickle 10 includes a plurality of relatively moveable sickle blades or sections 12 that operate in conjunction with a plurality of relatively stationary sickle blade guides 14. The sickle blades 12 each comprise a generally flat metallic plate having a generally triangular forward portion and a pair of beveled side edges 16. The sickle blades 12 are oriented in side by side relationship and are mounted at their rear ends to a reciprocating actuator bar 18.

The sickle blade guides 14 each comprise a unitary structure having a pair of substantially parallel, laterally spaced, forwardly projecting guide points 20 and one or more cross members extending between the guide points 20. In the illustrated embodiment, each blade guide 14 includes a forward and rear cross member 22, 24. Each guide point 20 includes a pointed end 26 and a blunt end 28 opposite the pointed end. The sickle blade guides 14 are removably mounted on a relatively stationary support or bar 30 located adjacent, and to the rear of, the reciprocating sickle bar 18 with the pointed ends 26 projecting forwardly.

As best seen in FIG. 2, each of the guide points 20 includes an open-ended slot 32 shaped, dimensioned and located to permit the passage of the reciprocating sickle blades 12 therethrough. As the sickle blades 12 reciprocate, a cutting action is produced between the side edges 16 of the sickle blades 12 and the edges of the adjacent guide points 20.

In accordance with one aspect of the invention, the sickle blade guide 14 is formed of a durable, resilient, molded thermoplastic material. Use of such a material in the formation of the blade guide 14 results in a blade guide that can tolerate impacts with obstacles, such as rocks and stumps, without breakage. Preferably, the thermoplastic material comprises an engineering resin such as a nylon, polycarbonate, urethane or polyester. A preferred material is B. F. Goodrich 59300 Eastaloc polyurethane.

To minimize wear as the sickle blades 12 reciprocate relative to the sickle blade guides 14, each blade guide 14 includes a pair of metallic wear plates 34 overlying the guide points 20 and oriented to engage and support an adjacent reciprocating sickle blade 12. In the illustrated embodiment, each of the wear plates 34 is formed of a rigid, durable metal, such as heat treated steel, and is located adjacent and forward of the juncture of the guide points 20 with the forward cross member 22. In the illustrated embodiment, each of the wear plates 34 is substantially trapezoidal in cross section and is of greater width than the underlying thermoplastic guide point 20 so that the side edges 36 of each wear plate project beyond the side walls 38 of the guide point 20. When so dimensioned and located, the side edges 36 of the wear plates 34 cooperate with the side edges 16 of the reciprocating sickle blades 12 to produce a well-defined cutting action.

Preferably, the wear plates 34 are permanently affixed to the thermoplastic material and are preferably molded in place as the sickle blade guide 14 is formed. To this end, each wear plate 34 preferably includes a plurality of apertures 40 that are tapered so as to be of greater dimension at the bottom surface of the plate than at the top, as best seen in FIG. 4. When so tapered, the molded thermoplastic material that fills the apertures 40 after molding functions to lock, securely, each wear plate 34 to the thermoplastic material.

To improve the cutting action, the side edges 36 of the wear plates 34 can be beveled, as shown in FIG. 6. A bevel angle of approximately 15° relative to vertical has been found to be effective. Alternatively, the side edges 36 of the wear plates 34 can be left square, as shown in FIG. 5 to reduce manufacturing costs. An effective cutting action is nevertheless developed with the square edge.

The sickle blade guide 14 as shown and described herein provides many advantages over earlier blade guides. The use of a durable, resilient, thermoplastic material results in a blade guide that can tolerate impacts with obstacles without breaking. This avoids the delay associated with replacing broken blade guides. Further, once the appropriate molding dies have been formed, the blade guides can be manufactured in large numbers quickly and economically. Although a particular blade guide configuration has been shown, it will be appreciated that the invention can be utilized with other blade guide configurations. For example, a single blade guide 14 can include more than the two guide points 20 shown in the figures. Similarly, the number, size and location of the apertures 40 through the wear plates 34 need not be precisely as shown. Furthermore, the means by which the blade guide 14 is removably attached to the support bar 30 need not be as shown and can be tailored to the particular guide bar configuration with which the blade guide 14 will be used.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A blade guide for guiding a reciprocating sickle blade in an agricultural mower, said blade guide comprising:
   a unitary structure formed of a thermoplastic material and having a pair of substantially parallel, laterally spaced, forwardly projecting guide points and a cross member extending between the guide points; and
   a pair a wear plates adjacent the guide points and oriented to engage and support a reciprocating sickle blade of the agricultural mower.

2. A blade guide as defined in claim 1 wherein said wear plates are formed of metal.

3. A blade guide as defined in claim 2 wherein said wear plates are molded in place.

4. A blade guide as defined in claim 3 wherein each of said wear plates includes at least one tapered hole and wherein the thermoplastic material of said blade guide fills said tapered hole to lock said wear plate to said thermoplastic material.

5. A blade guide as defined in claim 2 wherein each of said wear plates is trapezoidal in shape.

6. A blade guide as defined in claim 5 wherein each of said wear plates includes a side edge for providing a cutting action in cooperation with the reciprocating sickle blade in the agricultural mower.

7. A blade guide as defined in claim 6 wherein said side edge of said wear plate is beveled.

8. A blade guide as defined in claim 1 wherein said wear plates are located adjacent the juncture of said guide points and said cross member.

9. A blade guide as defined in claim 8 wherein each of said guide points includes an open-ended slot shaped, dimensioned and located to permit the passage of the reciprocating sickle blade therethrough, and wherein said wear plates are disposed within said slot so as to bear against the under surface of the reciprocating sickle blade.

10. A blade guide as defined in claim 1 wherein said thermoplastic material comprises an engineering resin.

11. A blade guide mountable on a stationary guide bar in an agricultural mower and operable to support and guide a reciprocating sickle blade in the agricultural mower, said blade guide comprising:
   a first guide point having a pointed end and a blunt end opposite said pointed end;
   a second guide point substantially identical to said first guide point;
   a forward cross member extending between said first and second guide points for maintaining said first and second guide points in spaced, substantially parallel orientation relative to each other;
   a rear cross member extending between said first and second guide points adjacent said blunt ends thereof; and
   a pair of wear plates mounted, respectively, on said first and second guide points adjacent the junctures of said forward cross member with said first and second guide points and oriented so as to engage and support the undersurface of an overlying sickle blade when said blade guide is mounted on the guide bar in the agricultural mower;

said first and second guide points and said forward and rear cross members being formed of a molded thermoplastic material and said wear plates being formed of metal.

12. A blade guide as defined in claim 11 wherein said first and second guide points and said forward and rear cross members are integrally formed.

13. A blade guide as defined in claim 12 wherein said thermoplastic material is an engineering resin and said metal is heat treated steel.

14. In a blade guide for supporting a reciprocating sickle blade in an agricultural mower, the improvement comprising forming the blade guide of a thermoplastic material and including a metallic wear plate where the reciprocating sickle blade contacts the blade guide.

15. The improvement as defined in claim 14 wherein said thermoplastic material comprises an engineering resin.

16. The improvement as defined in claim 15 wherein said metal comprises steel.

* * * * *